United States Patent Office 3,613,357
Patented Oct. 19, 1971

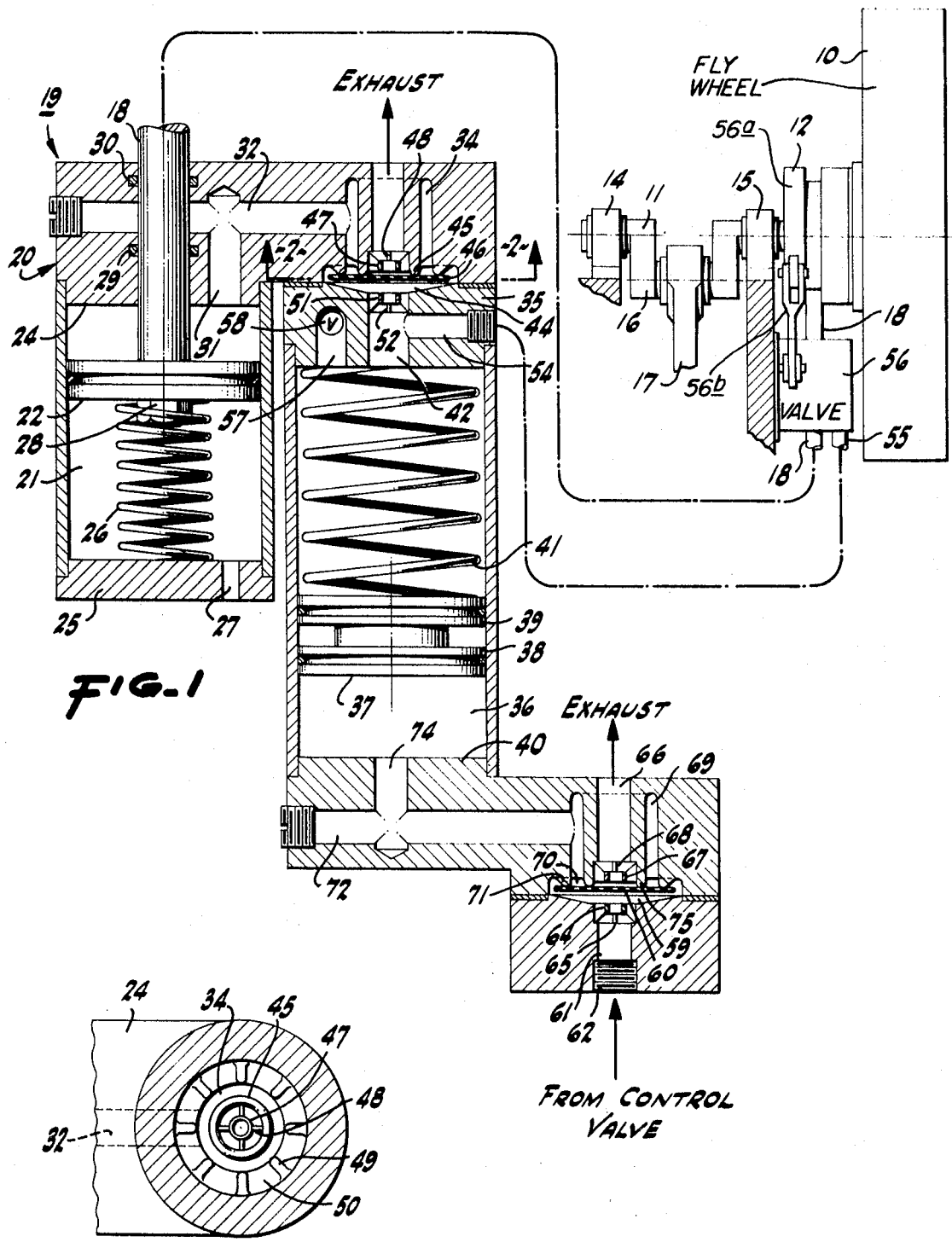

3,613,357
NON-REPEAT CONTROL APPARATUS FOR POWER MACHINERY
Clinton E. Withington, 21233 Gribben Ave., Hayward, Calif. 94541
Filed July 10, 1969, Ser. No. 840,666
Int. Cl. F15b *5/00, 11/16, 15/22*
U.S. Cl. 60—10.5                                    8 Claims

ABSTRACT OF THE DISCLOSURE

Non-repeat control apparatus for cyclically operative power machinery. Power machinery having a cyclically repetitive mode of operation such as punch presses perform one complete cycle of operation in response to manual initiation thereof. Control apparatus embodying the invention is effective to prevent inadvertent or repetitive cyclic operation of such machinery following any initiation of such cycle. The apparatus includes control mechanism comprising a cylinder having a piston reciprocable therein which is connected with the operating lever of the machinery to displace the same and thereby cause its operation. The control mechanism is actuated by energizing mechanism also comprised of a cylinder having a piston reciprocable therein. Whenever the piston of the energizing cylinder is displaced, a charge of compressed air is expressed into the control cylinder to displace the piston thereof into its machinery-actuating position. Exhaust means associated with the two cylinders dissipates any such charge of air after utilization by the control mechanism and also prevents delivery of a subsequent charge thereto until a cycle of operation of the power machinery has been completed.

---

This invention relates to control apparatus for power machinery and, more particularly, to non-repeat control apparatus for cyclically operative power machinery to prevent unintended and unwanted repeating of any cycle of operation thereof.

There is a large class of power machinery having a cyclically repetitive mode of operation and in such general class, by way of example, are punch presses which perform one complete cycle of operation in response to each manual or other initiation thereof to effect some forming function such as punching, blanking, stamping and drawing. Machinery of this type is quite dangerous and for this reason it is common to associate therewith various safety devices such as guard structures to prevent an operator from interposing a hand or other body part between the moving components of the machine, and it is also common to incorporate in such machinery control devices which are intended to prevent inadvertent operation of the machinery following any cycle of operation thereof.

Devices of this type that are now in use are for the most part unsatisfactory because operators of the associated machinery tend to place reliance thereon and yet such devices do not warrant such reliance because they do not positively prevent repeating energizations of the machinery following or associated with any cycle of operation thereof. In view thereof, an object, among others, of the present invention is to provide an improved non-repeat control apparatus for power machinery that is in fact effective to prevent repetitive energization of such machinery by inadvertence or otherwise closely after or in general association with any cycle of operation thereof.

Another object of the invention is in the provision of improved control apparatus of the type described which is effective to produce a charge of fluid of predetermined energizing capacity which is then utilized by the apparatus to effect energization of the power machinery, and which apparatus further includes exhaust means for dissipating any such charge of fluid after utilization thereof and for preventing delivery of a subsequent charge until a cycle of operation of the power machinery has been completed.

Still another object is that of providing non-repeat control apparatus of the character described that includes fluid-actuated control mechanism connectable with such power machinery to control operation thereof and which further includes energizing mechanism connected with the control mechanism and operative upon actuation to deliver a charge of fluid or predetermined energizing capacity to the control mechanism to cause the same to initiate a cycle of operation of the power machinery, the exhaust means for dissipating any charge of fluid being effective to prevent delivery of a subsequent charge to the energizing mechanism.

A further object is to provide control apparatus as described in which the control and energizing mechanisms include piston- cylinder structures, one of which is an energizing cylinder operative to deliver to the control cylinder a charge of compressed air having a predetermined volumetric capacity sufficient to energize the control mechanism and thereby effect operation of the power machinery associated therewith, dissipation of such charge of air following utilization thereof by the control cylinder and prevention of the development of a further charge of air until a cycle of operation of the power machinery has been completed being effective to prevent repetitive operation thereof.

Additional objects and advantages of the invention especially as concerns particular features and details thereof, will become apparent as the specification develops.

An embodiment of the invention is illustrated in the accompanying drawing in which:

FIG. 1 is a vertical sectional view of control apparatus embodyng the invention, interconnection thereof with typical power machinery being depicted by broken lines; and FIG. 2 is a transverse sectional view taken along the line 2—2 of FIG. 1.

As indicated hereinbefore, control devices embodying the invention are useful with a great variety of power machinery having a cyclically repetitive mode of operation characterized in the usual instance by effecting one complete cycle of operation in response to each manually initiated cycle. Exemplary of machinery in such general class are punch presses which perform one complete cycle of operation in response to each manual or other initiation thereof to effect some forming function such as punching, blanking, stamping, and drawing. Machinery of this type is well known in the art and requires no elaboration for purposes hereof. Generally, such a machine includes a continuously driven flywheel coupled by a one-revolution clutch to the crank or ram or other power-stroke mechanism of the machine, and control linkage operative to condition the clutch so as to connect the flywheel with such crank whenever the control lever or tripping device for the machine is manipulated.

In FIG. 1 a portion of such punch press (which for purposes of specificity may be a Model VNR punch press sold by the Kenco Manufacturing Company of Los Angeles, Calif.) is illustrated and it includes a flywheel 10 that is continuously driven by motor means, not shown, and is coupled to a crank shaft 11 through a one-revolution clutch 12. The crank shaft 11 is journaled for rotation adjacent the opposite ends thereof in bearing assemblies 14 and 15, and intermediate such bearing assemblies the crank shaft is provided with a throw 16 to which one end of a crank 17 is rotatably connected. Evidently, whenever the clutch 12 couples the flywheel 10 to the crank shaft 11, the crank shaft is angularly displaced through one complete rotational cycle of 360° whereupon the crank 17 is raised and lowered to effect one complete cycle of operation of the press.

In its ordinary or standby condition, the clutch 12 decouples the crank shaft 11 from the flywheel 10 so that the crank 17 remains in a predetermined inoperative position. The clutch 12 is actuated or made operative to effect a driving interconnection between the flywheel 10 and crank shaft 11 by downward dsplacement of a control lever 18 supported for reciprocable displacements by the machinery. Such downward displacement of the control lever 18 is usually effected by a trip or actuating mechanism which may take a great variety of forms, but in substantially every case it includes a control valve interposed in a compressed air supply line and when opened, permits delivery of compressed air to a motor means operative to displace the control lever 18 to actuate the clutch 12. Such control valve may be directly manipulated by a foot or hand lever connected thereto or it may be manipulated through the intervening agency of a solenoid or other power device.

The control apparatus shown in FIG. 1 is denoted in its entirety with the numeral 19 and it includes casing structure 20 defining a control cylinder 21 having a piston 22 axially reciprocable therein between an upper machine-deenergizing position generally adjacent the upper end closure 24 of the cylinder and a lower machinery-actuating position generally adjacent the lower end closure 25 of the cylinder. The piston 22 slidably and sealingly engages the walls of the cylinder 21, and it is biased upwardly toward the machinery-deactuating position adjacent the end closure 24 by a helical compression spring 26 seating at its lower end upon the upper inner surface of the end closure 25 and seating at its upper end against the bottom surface of the piston 22. The lower end portion of the cylinder 21 is exhausted to atmosphere through a port or opening 27 so that no pressure forces develop intermediate the piston 22 and the end closure 25 that would inhibit downward displacement of the piston.

The piston 22 is fixedly secured to the control lever 18 in any suitable manner such as by having a reduced end portion extending through the piston and secured thereto by a nut 28. The control lever 18 extends upwardly through an opening provided therefor in the upper end closure 24 and the control lever is sealingly related thereto by a plurality of O-rings 29 and 30. Ordinarily the compression spring 26 biases the piston 22 and control lever 18 upwardly so as to maintain the clutch 12 in the decoupling position thereof in which the flywheel 10 does not drivingly engage the crank shaft 11. The piston 22 can be displaced downwardly against the biasing force of the spring 26 by introduction of compressed air into the upper end portion of the piston 21 intermediate the upwardly-facing surface of the piston and downwardly facing surface of the end closure 24.

In this respect the upper end closure 24 has an opening or passageway 31 communicating at its lower end with the cylinder 21 and at its upper end with a passage 32. The passage 32 opens into an annulus 34 provided within the upper end closure 24 adjacent an end portion thereof projecting beyond the dimensional limits of the cylinder 21. Such extension of the end closure 24 overlies the upper end closure 35 of an energizing cylinder 36.

The cross sectional areas of the control cylinder 21 and energizing cylinder 36 are of the same order of magnitude but the energizing cylinder is of substantially greater axial length than the control cylinder 21. This difference in the volumetric capacities of the two cylinders is advantageously employed in effecting downward displacement of the control piston 22 as will be described in greater detail hereinafter.

Reciprocable within the energizing cylinder 36 is a piston 37 having axially spaced lands 38 and 39 equipped with O-ring seals to slidingly and sealingly relate the same to the circumjacent walls of the cylinder. The piston 37 is biased downwardly toward the lower end closure 40 of the energizing cylinder 36 by a helical compression spring 41 seating at its lower end upon the upper surface of the piston and sealing at its upper end against the end closure 35.

The upper end closure 35 of the energizing cylinder 36 is provided with an outlet passage 42 extending upwardly from the cylinder and provided intermediate the ends thereof with a valve chamber 44 that is substantially larger in cross sectional area than the remainder of the passage. The chamber 44 is provided with a downwardly facing valve seat 45 of annular configuration adapted to be sealingly engaged by a resilient wafer valve 46 freely supported within the chamber 44 for movement between the upper position illustrated in which it sealingly engages the seat 45 and a lower position not shown in which it is spaced from the seat. The valve 46 is relatively thin and flexible, and support is provided therefor to prevent it from deforming into the passage defined interiorly of the seat 45 and such support takes the form of a ring 47 centrally disposed with respect to the seat 45 and supported by a plurality of radially extending ribs 48 as seen most clearly in FIG. 2.

Disposed at angularly spaced locations generally circumjacent the valve seat 45 are a plurality of ribs or abutment elements 49 that function to support the circumferential edge portion of the wafer valve 46 in the upper position thereof shown in which it sealingly engages the valve seat 45. Evidently then, when the valve 46 is in the closed position shown in FIG. 1, air can flow upwardly about the outer edge thereof, through the channel-like spaces 50 defined between adjacent abutment elements 49, and into the annulus or annular space 34 from which it flows into the passage 32 and through the passageway 31 into the cylinder 21. A spider-like support structure comprising a ring and radially extending support ribs 52 are located within the passage 42 beneath the valve chamber 44 to prevent the valve 46 from being deformed into the passageway should pressure operative upon the upper surface of the valve tend to cause such result.

Extending laterally from the passage 42 intermediate its communication with the energizing cylinder 36 and valve chamber 44 is a cam-controlled valve passage 54 connected, as indicated diagrammatically by the broken lines, with the inlet 55 of a valve 56 which is controlled by the one-revolution clutch 12. At the initiation of a cycle of operation, the valve 56 is closed so that upward displacement of the piston 37 expresses air through the passage 42 and into the passage 32 via the annulus 34 for entrance into the control cylinder 21 through the passageway 31. Whenever the one-revolution clutch 12 couples the flywheel 10 with the crank shaft 11 to initiate rotation thereof, immediately thereafter the valve 56 is opened by the consequent rotation of a cam 56a associated with the clutch 12 and displacement of a valve-operating cam follower 56b riding on the cam, whereupon the passage 54 is connected to atmosphere so as to exhaust that portion of the energizing cylinder 36 located above the piston 37.

The end closure 35 of the energizing cylinder 36 is also provided with an air inlet passage 57 opening at one end into the cylinder 36 and at its opposite end communicating with atmosphere through a check valve generally denoted at 58. The check valve 58 functions to admit air into the cylinder 36 whenever the piston 37 thereof is displaced downwardly by the spring 41, but reverse displacement of the piston 37 which creates a positive pressure within the upper end portion of the cylinder closes the valve 58 to prevent escape of air therethrough from the cylinder 36. Thus, the passage 57 and check valve 58 associated therewith assures the presence of a charge of air within the upper end portion of the cylinder 36 each time the piston 37 is displaced downwardly into its deenergizing position.

A quick exhaust valve substantially identical to the quick exhaust valve heretofore described that includes the valve chamber 44 and valve 46 is provided adjacent the lower end portion of the energizing cylinder 36 in association with the bottom end closure 40. This quick exhaust valve assembly includes a valve chamber 59 having a thin, somewhat flexible wafer valve 60 located therein. At its lower end the chamber 59 is in, open communication with an inlet passage 61 having a threaded enlargement 62 by means of which the passage is connected with an air supply line by means of which air under pressure is selectively delivered to the valve chamber 59. More particularly, and as explained hereinbefore, such supply line, which is not shown, is provided with a control valve therealong by means of which the operator of the machine initiates each cycle of operation thereof. Since the supply line is connected to a source of pressurized air, each time that the control valve is opened by the machine operator air under pressure is delivered to the passage 61 and flows therefrom into the valve chamber 59.

The passage 61 is equipped with a ring 64 and support spider 65 therefor and in a similar manner an exhaust passage 66 communicating at one end with atmosphere and at its other end with the valve chamber 59 is provided with a ring 67 and support spider 68. The two rings 64 and 67 and respectively associated support spiders 65 and 68 serve the same function as the rings 47 and 51 heretofore described. Coaxially circumjacent the exhaust passage 66 is an annulus 69 connected at its lower end through spaces 70 defined between angularly spaced ribs or abutments 71 with the valve chamber 59. Generally adjacent its opposite end the annulus 69 connects through a passage 72 and branch passageway 74 with the lower end of the energizing cylinder 36. The quick exhaust valve comprising the valve chamber 59 and valve 60 perform exactly the same control function as the quick exhaust valve comprising the chamber 44 and valve 46 and therefore when air under pressure is delivered to the passage 61 the valve 60 is displaced upwardly into the position shown in which it sealingly engages the annular seat 75 at the lower end of the annulus 69 to close off the exhaust passage 66 whereupon the compressed air flows about the circumferential edge portion of the valve 60 to enter the annulus 69 for delivery via the passage 72 and passageway 74 to the lower end portion of the energizing cylinder 36.

The apparatus as illustrated in FIG. 1 is depicted immediately after a cycle of operation has commenced. Accordingly, the cam controlled valve 56 is in its initial condition in which the passage 54 associated therewith is closed and the compressed air being delivered to the passage 61 has displaced the valve 60 upwardly to sealingly engage the seat 75. As a consequence, the piston 37 has been displaced upwardly and the resultant positive pressure being developed within the upper end portion of the energizing cylinder 36 between the piston 37 and upper end closure 35 has displaced the valve 46 upwardly into sealing engagement with the valve seat 45. Correspondingly, the control piston 22 has been displaced downwardly through a limited distance because of the positive pressure being delivered to the upper end portion of the control cylinder 21 through the passage 32 and passageway 31.

The continued delivery of air under pressure to the inlet passage 61 results in the compressed air flowing upwardly about the circumferential edge of the valve 60, through the openings 70 and into the annulus 69 from which it is delivered by the passage 72 and passageway 74 into the lower end portion of the energizing cylinder 36. Such delivery of air continues until the piston 37 has been displaced upwardly toward the end closure 35 and into general adjacency therewith. Such upward displacement of the piston 37 delivers a charge of air through the passage 42, valve chamber 44, and annulus 34 (about the circumferential edge of the valve 46 and through the openings 50) into the passage 32 and through the passageway 31 communicating therewith to the upper end portion of the control cylinder 21. The charge of compressed air so delivered to the control cylinder 21 displaces the piston 22 downwardly toward the bottom end closure 25. As the piston 22 approaches its maximum downstroke displacement it enters the machinery-actuating position thereof in which the lever 18 as a consequence of its downward displacement energizes the clutch 12 causing it to drivingly connect the flywheel 10 with the crank shaft 11. The punch press or other machinery associated with the crank 17 is thereby caused to carry out a complete cycle of operation thereof.

After the driven section of the clutch 12 and crank shaft 11 have been displaced through a predetermined angular distance (the extent of such displacement is not critical but, for example, may be of the order of 20°), the valve 56 is opened whereupon the pressure within the upper end portion of the energizing cylinder 36 is reduced to atmospheric pressure, thereby causing the much greater pressure present within the upper end portion of the control cylinder 21, passageway 31, passage 32 and annulus 34 to displace the valve 46 downwardly. As soon as the valve 46 is displaced from the seat 45, the pressure within the annulus 34 and associated pressurized spaces is exhausted to atmosphere through the relatively large upper end portion of the passage 42. Thus, the space within the control cylinder 21 intermediate the piston 22 and upper end closure 24 is exhausted to atmosphere and the biasing force of the spring 26 returns the piston 22 to its upper machinery-deactuating position and the lever 18 is returned to its initial position in which it deenergizes the clutch 12 following one complete revolution thereof.

In this condition of the control apparatus 19 the punch press or other machinery associated with the crank 17 cannot be intentionally or inadvertently actuated to a subsequent cycle of operation. More particularly, and considering the two possibilities which could result in such actuation, the first possibility involves some occurrence during the interval in which air under pressure continues to be supplied to the passage 61. Such continued supply of air causes the energizing piston 37 to be maintained in its upper energizing position adjacent the end closure 35; but since the passage 54 is connected to atmosphere and the piston 22 is in its upper machinery-deactuating position there is no way of developing a super atmospheric pressure within the upper end portion of the control cylinder 21 to displace the piston 22 thereof downwardly. Therefore, no inadvertent or intended recycling of the punch press can occur while the energizing piston 37 is in its upper position and the upper end portion of the control cylinder 21 is at atmospheric pressure because the cam-controlled valve 56 is open.

The second possibility and one most likely to occur, involves the control valve being released by the machine operator whereupon the pressure at the passage 61 is reduced to atmospheric pressure and the valve 60 is displaced downwardly because of the higher-value pressure within the annulus 69. As the valve 60 leaves the seat 75 the lower end portion of the energizing cylinder 36 is quickly exhausted via the passageway 74, passageway 72, annulus 69, spaces 70 and exhaust passage 66. As a result, the biasing force of the spring 41 displaces the piston 37 downwardly into its deenergizing position. After this occurs, assume the condition in which the operator manipulates the control valve so as to again supply a positive pressure to the passage 61. The valve 60 will be displaced upwardly to sealingly engage the seat 75 as shown and the positive pressure being delivered through the passage 72 and passageway 74 will displace the piston 37 upwardly into its energizing position. However, the machinery will not again be actuated because the air tending to be compressed above the rising piston 37 will simply be exhausted to atmosphere through the passage 54. Therefore, it may be said that so long as the valve 56 is in its open position, the punch press machinery cannot be recycled even by repeated displacements of the energizing piston 37 into the energizing position thereof. However, as the one-revolution clutch 12 and crank shaft 11 complete one revolution, the valve 56 is again closed, and the control apparatus 19 is in condition to effect another cycle of operation upon manipulation of the main control valve for the machinery.

The control apparatus 19 interposes, in an operational sense, between the compressed air supply line and the lever 18 a means for using a predetermined volume or charge of air for moving the lever 18 for the unlimited charge of air otherwise provided by the compressed air supply line. That is to say, the only charge of air available for displacing the lever 18 into the machinery-actuating position thereof, is the charge defined by the volumetric capacity of the energizing cylinder 36, or more specifically, that portion thereof lying between the upper land 39 of the piston 37 when it is in its full downstroke position and the upper end closure 35. As the energizing piston 37 is displaced upwardly the volume of air initially at atmospheric pressure is displaced thereby through the passage 42, valve chamber 44, annulus 34, and associated passageways into the upper end closure of the control cylinder 21 to displace the piston 22 thereof downwardly. No other charge of air is available to effect such downward displacement of the control piston 22 so that once such charge of air of predetermined volumetric capacity is used to effect the displacement of the piston 22 no further charge of air is available to again effect such displacement of the piston 22 until the energizing piston 37 has returned to its initial position and the cam-controlled valve 56 has been closed. It is evident, therefore, that the control apparatus provides a positive means for preventing recycling, inadvertent or otherwise, of the machinery connected with the crank 17.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. Control apparatus for assuring non-repetitive operation of cyclically operative power machinery, comprising fluid-actuated control mechanism connectable with such machinery to control operation thereof and being effective upon delivery of a charge of fluid thereto of predetermined energizing capacity to initiate a cycle of operation of such machinery, energizing mechanism connected with said control mechanism and being operative upon actuation to deliver such an energizing charge of fluid to said control mechanism to cause the same to initiate a cycle of operation of such machinery, means for actuating said energizing mechanism, and exhaust means responsive both to said energizing mechanism and to such machinery for dissipating any charge of fluid delivered to said control mechanism either upon deactuation of said energizing mechanism or upon completion of a cycle of operation of such machinery and for preventing delivery of a subsequent energizing charge to said control mechanism until a cycle of operation of such machinery initiated by a prior energizing charge has been completed.

2. The control apparatus of claim 1 in which said fluid-actuated control mechanism includes a control cylinder having a control piston axially reciprocable therein between machinery-actuating and machinery-deactuating positions, said control piston being equipped with a rod connectable with such machinery.

3. The control apparatus of claim 2 in which said energizing mechanism includes an energizing cylinder having an energizing piston axially reciprocal therein between energizing and deenergizing positions, and in which said means for actuating said energizing mechanism includes passage means for connecting said energizing cylinder with a source of pressurized fluid operative to displace said energizing piston into the energizing position thereof.

4. The control apparatus of claim 3 in which said fluid-actuated control mechanism further includes spring means for biasing said control piston toward the machinery-deactuating position thereof, in which said energizing mechanism further includes spring means biasing said energizing piston toward its deenergizing position, and in which said exhaust means includes a control valve connected with the energizing end portion of said energizing cylinder for exhausting the same subsequent to displacement of said energizing piston into the energizing position thereof.

5. Control apparatus for assuring non-repetitive operation of cyclically operative power machinery comprising fluid-actuated control mechanism connectable with such machinery to control operation thereof and being effective upon delivery of a charge of fluid thereto to initiate any cycle of operation of such machinery, energizing mechanism connected with said control mechanism and being operative upon actuation to deliver a charge of fluid of predetermined energizing capacity to said control mechanism to cause the same to initiate a cycle of operation of such machinery, exhaust means for dissipating any charge of fluid delivered to said control mechanism after utilization thereby and for preventing delivery of a subsequent charge thereto until a cycle of operation of such machinery has been completed, means for actuating said energizing mechanism, said energizing mechanism including an energizing cylinder having an energizing piston axially reciprocable therein between energizing and deenergizing positions, said means for actuating said energizing mechanism including passage means for connecting said energizing cylinder with a source of pressurized fluid operative to displace said energizing piston into the energizing position thereof, and a check valve defining air admission means connected with said energizing cylinder adjacent the end thereof corresponding to the energizing position of said energizing piston for admitting a charge of air into said energizing cylinder upon return displacement of said energizing piston into the deenergizing position thereof.

6. The control apparatus of claim 5 in which said fluid-actuated control mechanism includes a control cylinder having a control piston axially reciprocable therein between machinery-actuating and machinery-deactuating positions, said control piston being equipped with a rod connectable with such machinery, said control and energizing cylinders being flow connected adjacent the end portions thereof respectively corresponding to the machinery-deactuating and energizing positions of their associated pistons so that a charge of fluid admitted into said energizing cylinder is expressed therefrom upon displacement of said energizing piston into its energizing position to energize displacement of said control piston into its machinery-actuating position and thereby actuate a cycle of operation of such machinery.

7. The control apparatus of claim 6 in which said fluid-actuated control mechanism further includes spring means toward biasing said control piston for the machinery-deactuating position thereof, in which said energizing mechanism further includes spring means biasing said energizing piston toward its deenergizing position, and in which said exhaust means includes a control valve connected with the energizing end portion of said energizing cylinder for exhausting the same subsequent to displacement of said energizing piston into the energizing position thereof.

8. The control apparatus of claim 7 and further comprising a plurality of quick-exhaust valve structures respectively connected with the fluid-admission in portions of said control cylinder and energizing cylinder to effect quick exhausting thereof.

References Cited
UNITED STATES PATENTS

| Re. 24,006 | 5/1955 | Acton | 91—401 |
|---|---|---|---|
| 2,261,444 | 11/1941 | Neubert, Jr. | 91—401 |
| 3,063,425 | 11/1962 | Vier et al. | 91—401 |
| 3,173,341 | 3/1965 | Carpenter | 91—401 |
| 3,361,036 | 1/1968 | Harvey et al. | 91—401 |

PAUL E. MASLOUSKY, Primary Examiner

U.S. Cl. X.R.

91—400, 442, 443